United States Patent
Castillo et al.

[11] Patent Number: 5,921,143
[45] Date of Patent: Jul. 13, 1999

[54] COUPLING DEVICE FOR A SHEATHED CABLE AND METHODS OF CONSTRUCTING AND UTILIZING SAME

[75] Inventors: Gilbert Castillo, Dublin; Masahiro Izumi, Westerville, both of Ohio

[73] Assignee: Honda Giken Kogyo Kabushiki Kaisha, Tokyo, Japan

[21] Appl. No.: 08/900,378

[22] Filed: Jul. 12, 1997

[51] Int. Cl.⁶ .................................................. F16C 1/22
[52] U.S. Cl. ..................... 74/502.4; 74/501.5 R
[58] Field of Search ................ 74/502.6, 502.4, 74/501.5 R, 500.5

[56] References Cited

U.S. PATENT DOCUMENTS

| | | |
|---|---|---|
| 5,142,933 | 9/1992 | Kelley .......................... 74/501.5 R X |
| 5,156,064 | 10/1992 | Truman . |
| 5,435,202 | 7/1995 | Kitamura . |
| 5,531,134 | 7/1996 | Petruccello .......................... 74/502.4 |
| 5,544,543 | 8/1996 | Hilgert et al. . |
| 5,560,261 | 10/1996 | Kitamura . |
| 5,564,314 | 10/1996 | Gabas . |
| 5,571,237 | 11/1996 | Lu et al. . |
| 5,577,415 | 11/1996 | Reasoner . |
| 5,584,212 | 12/1996 | Wild . |

Primary Examiner—John A. Jeffery
Assistant Examiner—Mary Ann Battista
Attorney, Agent, or Firm—Carrier, Blackman & Associates, P.C.; Joseph P. Carrier; William D. Blackman

[57] ABSTRACT

A coupling device for a sheathed cable comprises a first coupling member for being connected to an end of a sheath of a sheathed cable and having a recess defined therein, a second coupling member slidable within the recess of the first coupling member, the first and second coupling members having openings defined therethrough so that the end of a core of the sheathed cable may be extended through the coupling members and operatively connected to one of an actuating mechanism and an actuatable mechanism, and a clip engageable to the first and second coupling members for locking the members together. The clip locks the two coupling members together in a first position in which the coupling members may be moved relative to each other, and a second position in which the coupling members are immovably fixed to each other, the coupling members being moveable relative to each other by a predetermined distance when moved from the first position to the second position, and the predetermined distance corresponding to a predetermined amount by which the cable core is tensioned.

24 Claims, 2 Drawing Sheets

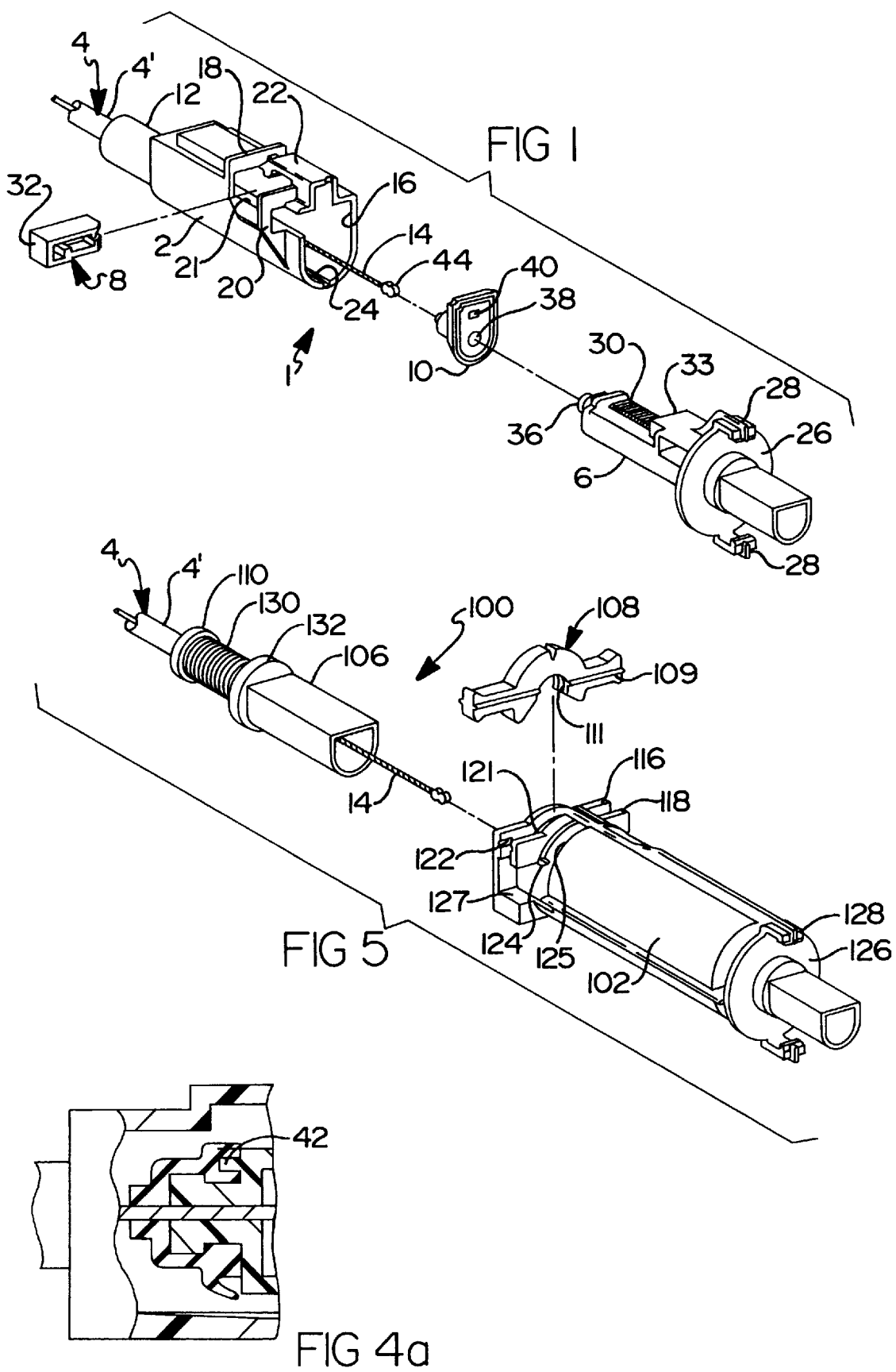

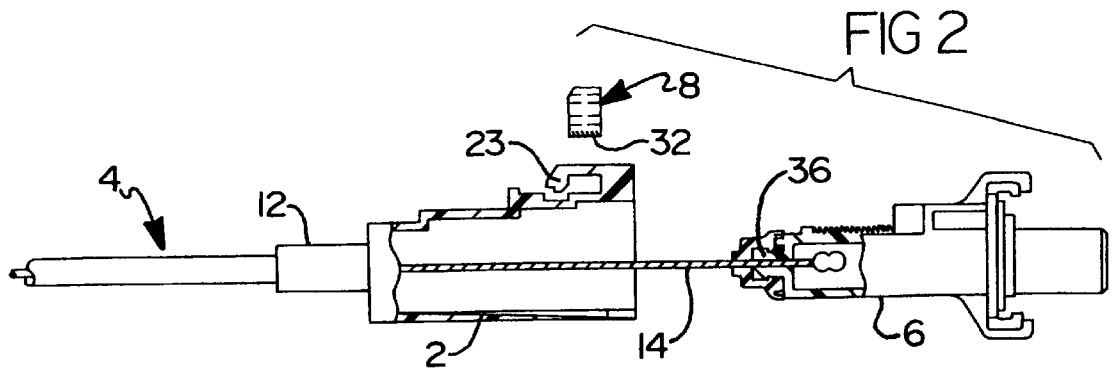
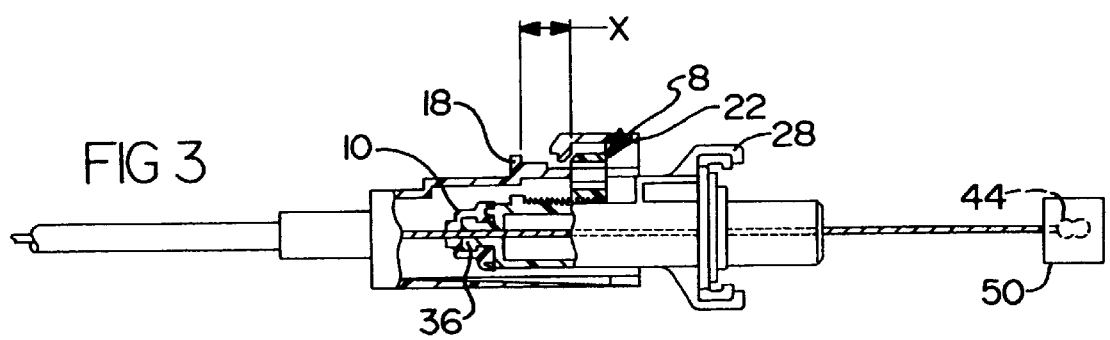
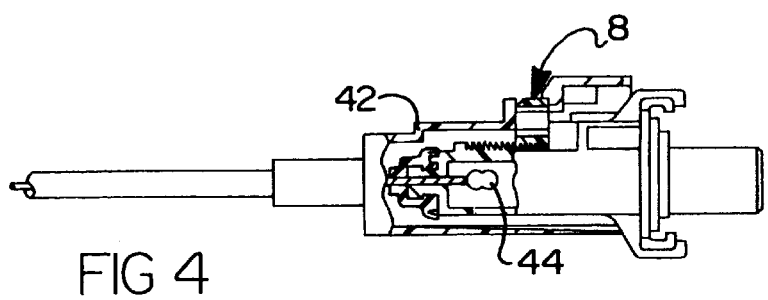

COUPLING DEVICE FOR A SHEATHED CABLE AND METHODS OF CONSTRUCTING AND UTILIZING SAME

1. THE PRESENT INVENTION

The present invention pertains to a coupling device for a sheathed cable, such as a control cable extending from an accelerator pedal to an electronic cruise control unit of a vehicle, and to methods of constructing and utilizing same. More particularly, the invention pertains to such a coupling device which precisely and conveniently adjusts the slack or tension of the cable when the cable is installed or coupled in an operative arrangement thereof; and to methods of constructing and utilizing same such coupling device.

2. DISCUSSION OF RELEVANT ART

Sheathed control cables are conventionally used for connecting actuatable mechanisms with remote actuating mechanisms therefor, and coupling devices for coupling the sheathed cables to the actuatable and actuating mechanisms are conventionally known. Frequently, the control cable is designed to have an excess length so that it may be easily installed in place between the actuatable and actuating mechanisms, and relatedly some coupling devices have also been conventionally provided with mechanisms for removing the slack or adjusting the tension of the cable after it is installed. For example, several such known adjusting mechanisms are disclosed in U.S. Pat. Nos. 5,584,212 (Wild), 5,571,237 (Lu et al.), 5,564,314 (Gabas), 5,560,261 (Kitamura), 5,544,543 (Hilgert et al.), 5,435,202 (Kitamura), and 5,156,064 (Truman). Each of such known coupling devices typically includes at least a pair of coupling members, one of which is fixed to an end of the cable or cable sheath, and which are movable relative to each other for adjusting the cable tension or slack; and a locking mechanism for locking the coupling members together after they have been adjusted to a desired position relative to each other.

For example, U.S. Pat. No. 5,571,237 (Lu et al.) discloses a cable core adjuster with lock members used for adjusting the tension or removing the slack of a manual shift control cable in an automatic transmission for a vehicle. The adjuster includes a first adjustable body having one end of the cable sheath fixed thereto and an adjustable core body into which the adjustable body may be selectively inserted against the bias of a spring disposed within the adjustable core body, a removable locking clip associated with the two adjustable bodies for presenting inadvertent early adjustment of the cable length, and a second moveable lock member operatively associated with the two adjustable bodies for locking them in a desired, adjusted orientation. Although the cable core adjuster disclosed in the patent is effective for its intended purpose, it has certain disadvantages associated therewith, including a relatively large number of operative components rendering the adjuster relatively expensive to manufacture and install. Additionally, the exact amount of slack or tension adjustment effected by the cable core adjuster is variable and ultimately determined or established by persons installing the cable and the adjuster because the two adjustable bodies may be variably adjusted relative to each other over a range of distances.

Somewhat similarly, the two cable length-adjusting devices disclosed by Kitamura in U.S. Pat. Nos. 5,560,261 and 5,435,202 each include an adjusting pipe which is fixed to one end of a cable sheath, a base member having an opening through which the adjusting pipe may be inserted, and an adjustable locking piece slidably connected to the base member. The locking piece may be selectively moved between a first position out of contact with the adjusting pipe in which the adjusting pipe may be moved relative to the base member, and a second position in which the locking piece securely engages the adjusting pipe so as to lock the adjusting pipe and the base member in a given position relative to each other. The adjusting pipe has a row of latching teeth provided on one face thereof, and the locking piece has locking teeth provided on an inner end thereof which are selectively engageable with the latching teeth on the adjusting pipe for locking the adjusting pipe in position relative to the base member. Additionally, Kitamura's device may optionally include a spring biasing means for the adjusting or locking piece. Although Kitamura's device has desirably fewer components than Lu's cable cord adjuster, it also disadvantageously requires persons installing the device to determine or establish the amount of cable length adjustment effected therewith because the adjusting pipe and the base member are variably movable relative to each other over a range of distances.

U.S. Pat. No. 5,564,314 (Gabas) discloses a somewhat similar cable control length adjusting device including a regulating rod fixed to one end of a cable sheath, a base body into which one end of the regulating rod is snugly, slidably fitted, and a locking ring fitted on one end of the base body and having screw threads provided on inner surfaces thereof for operatively engaging with screw threads provided on the outer surface of the regulating rod. In use, the regulating rod having the cable sheath fixed thereto is connected to the base body in a given position while the cable is loosely installed between actuating and actuatable mechanisms, after which the initial operation of the actuating mechanism pulls on the regulating rod with sufficient force that it is moved relative to the base body against the locking engagement between the screw threads on the locking ring and the regulating rod, thereby effecting a self-adjustment of the slack or tension of the cable. Again, this known device of Gabas includes a desirably fewer number of components than the adjuster of Lu, but the self-adjusting nature of the cable length adjustment effected according to the device is undesirable because it may not be precisely or consistently effected for each installation thereof, and because the reliance of the control mechanism to effect the adjustment causes certain delays and complications in determining whether proper installation has been effected.

The cable length adjusting device disclosed in U.S. Pat. No. 5,544,543 (Hilgert et al) is somewhat similar to that of Gabas above in that cable length adjustment may be effected in an "automatic" manner, although Hilgert's device is more structurally complex than that of Gabas. Particularly, Hilgert's device includes a first coupling member or collet having the end of the sheath of a cable or rope fixed thereto, a second coupling member which is selectively, slidably received in the first coupling member, and a manually movable securing element disposed on the first coupling member and movable between a first position in which the two coupling members are movable relative to each other and a second position in which the two coupling members are locked together. The second coupling member has a plurality of teeth provided on the outer surface thereof, and the first coupling member has a pair of spring arms having teeth on inner faces thereof for engaging the teeth of the first coupling member. In use, after the ends of the cable have been installed between actuating and actuatable mechanisms, the locking member is moved to the first position thereof so that the two coupling members may be moved relative to each other for adjusting the length of the cable, after which the locking member is moved to the second position thereof to lock the two coupling members together. Optionally, a spring may be operatively disposed between a first and second coupling members for effecting an automatic adjustment of the tension or slack of the cable when the locking member is moved to the first position thereof. Hilgert's device is disadvantageous for those reasons discussed above in relation to Gabas, and also due to the relatively complex structure thereof.

U.S. Pat. No. 5,156,064 (Truman) discloses a cable length adjustment device for use between a gear shift lever and a transmission cable, including an elongate member connectable at one end to the transmission cable, a housing connected at one end to the gear shift lever, and a locking member which may be operatively associated with the elongate member and the housing for locking these components in a desired orientation relative to each other. The elongate member has a threaded section thereon, and the locking member has a threaded aperture therethrough such that the elongate member may be rotated relative to the locking member and the housing for adjusting the length or tension of the transmission cable. This device is disadvantageous for those reasons discussed above in relation to several of the other known devices, including complexity, cost, and imprecision in adjustment, noting that persons installing the device are required to rotate the elongate member in varying amounts to effect the cable length adjustment.

U.S. Pat. No. 5,584,212 (Wild) discloses a cable end fitting assembly including a guide member having an end of a cable secured through an internal portion thereof, a housing having a central aperture or bore for movably receiving the guide member therethrough, and a locking clip which is slidably fitted to the housing between a first position in which it does not engage the guide member so that the guide member may be moved relative to the housing, and a second position in which it engages the guide member to lock the guide member and housing in a given orientation. The guide member has teeth or threads along the outer surface thereof, and the locking member has a threaded recess which engages the teeth or thread on the guide member in a locking manner. As with the other devices, the movement of the guide member relative to the housing adjusts the cable slack or tension. Additionally, the assembly includes a spring disposed between the guide member and the housing for facilitating adjustment therebetween. As with the other known devices discussed above, this assembly is disadvantageous in that the cable tension adjustment permitted thereby is variably and imprecisely controlled by persons installing the assembly, and due to the number of components associated therewith.

All of the above known cable coupling and tensioning devices are also disadvantageous in that the end of the cable sheath as fixed to one portion of the cable adjusting device is typically prone to receive moisture therein, and the moisture tends to travel along the cable core within the coupling or tensioning device and from there into the sheath. Such moisture is undesirable because it causes cable core and/or the sheath to corrode.

The present invention has been developed to overcome the problems and disadvantages associated with known control cable coupling mechanisms including those discussed above.

SUMMARY OF THE INVENTION

According to the invention there is provided a coupling device for a sheathed cable, comprising: a first coupling member for being connected to an end of a sheath of a sheathed cable the first coupling member having a recess defined therein;

a second coupling member shaped for sliding insertion into the recess of the first coupling member;

the first and second coupling members having openings defined therethrough so that an end of a cable core of the sheathed cable may axially extend through the first and second coupling members and be operatively connected to one of an actuating mechanism and an actuatable mechanism; and a clip for securing the first and second coupling members together when the second coupling member is inserted in the recess of the first coupling member;

the first coupling member having an opening in a side wall thereof;

the clip is insertable in the opening to engage surfaces of the first and second coupling members; and the first and second coupling members being positionable in different positions when engaged by the clip, including an initial locking position and a cable length adjusting locking position spaced a predetermined distance from said initial locking position. The predetermined distance corresponds to a predetermined tensioning amount applied to the cable core by the coupling device when the coupling members are moved from the initial locking position to the cable length adjusting locking position.

Preferably, the locking means will consist exclusively of the clip selectively connectable between the first and second coupling members, and engaging surfaces on the clip and the coupling members; while the clip is preferably moveable together with the second coupling member relative to the first coupling member as the coupling members are moved relative to each from the initial locking position to the cable length adjusting locking position.

According to the above features of the invention, the coupling device according to the invention has a desirably simple structure, consisting of the two coupling members and the clip member; while use of the coupling device for precisely adjusting the tension of a sheathed cable is an extremely simplified procedure because it merely involves moving the two coupling members relative to each other until they are locked into place by the clip member.

According to other preferred aspects of the invention, the coupling device may also include sealing means disposed between the first and second coupling members for preventing moisture from being introduced into the end of the cable sheath along the end of the cable, and drain means for draining moisture from between the first and second coupling means. Such sealing and drain means are desirable to prevent corrosion and premature deterioration of the control cable and the coupling device.

It is an object of the invention to provide a coupling device for a sheathed cable which permits the cable to be quickly, precisely, and consistently tensioned as it is installed between actuating and actuatable mechanisms.

It is another object of the invention to provide such a coupling device comprising a minimum number of components, each of which is simple in structure and all of which are easily manipulatable relative to each other, such that the device is inexpensive to manufacture and install.

It is still another object of the invention to provide such a coupling device which is very stable and secure when installed, but it is also easily removable and reinstallable for servicing and the like.

Still a further object of the invention is to provide such a coupling device which is highly durable, reliable, and resistant to moisture damage both to itself and to a cable coupled thereby.

Other objects, advantages, and salient features of the invention will become apparent from the detailed description below which, together with the annexed drawings, discloses presently preferred embodiments of the invention.

BRIEF DESCRIPTION OF THE DRAWINGS

FIG. 1 is an exploded, perspective view of a cable coupling device according to a first preferred embodiment of the invention.

FIG. 2 is an exploded, partly sectional, side elevational view of the cable coupling device of FIG. 1.

FIG. 3 is a partly sectional, side view of the cable coupling device of FIG. 1 in which the several components thereof have been joined together in a first or non-adjusted, locked position thereof.

FIG. 4 is a partially sectional side view of the coupling device of FIG. 1 in which the several components thereof have been joined together in a second or adjusted, locked position thereof.

FIG. 4a is an enlargement of an end portion of a component in the coupling device of FIGS. 1–4.

FIG. 5 is an exploded, perspective view of a cable coupling device according to a second preferred embodiment of the invention.

DETAILED DESCRIPTION OF THE PREFERRED EMBODIMENTS

Referring to FIGS. 1–4 there is shown a coupling device 1 according to a first preferred embodiment of the invention. The coupling device 1 includes a first coupling member 2 having one end thereof fixed to an end of a sheathed cable 4, and an open opposite end, a second coupling member 6 having one end which is selectively insertable within the open end of the first coupling member and an opposite end which is connectable to an actuatable or actuating mechanism generally indicated by box 50 in FIG. 3, a locking clip 8 operatively connectable to the first and second coupling members 2,6 for locking the coupling members together, and an optional sealing member 10. An inner core 14 of the cable 4 is constructed of steel or the like and opposite ends thereof will be connected to an actuatable mechanism, such as an accelerator pedal, and an actuating mechanism, such as an electronic cruise control mechanism, respectively, so that the cable core is operatively secured separately from a sheath 4' of the cable and the coupling members 2, 6. An anchoring nipple 44 is shown on the depicted end of the inner core 14, the nipple being part of a coupling mechanism for joining the cable to an actuating or actuatable mechanism generally indicated by box 50 in FIG. 3.

The first coupling member 2 is a hollow member preferably constructed of a rigid plastic such as PVC or any other suitable material, and most preferably it is injection molded as a unitary member. The sheathed cable 4 is connected to the one end of the coupling member 2 such that the end of the cable sheath 4' is fixed to a receiving portion 12 of the coupling member 2, while the inner cable core 14 of the cable passes completely through the coupling member 2 and is axially movable relative thereto. The open end 16 as well as the hollow space within the coupling member 2 are shaped to slidingly receive one end of the second coupling member 6 therein such that the end of the second coupling member is enclosed within the recess of the first coupling member. As shown in the drawings, the first and second coupling members respectively receive therein contiguous portions of the cable core 14 which extends through the coupling members. As shown, for example, the opening and hollow space are substantially U-shaped in cross section, or some other non-round shape, such that the first and second coupling members 2, 6 are prevented by such shape from rotating relative to each other when inserted together. In other words, the two coupling members are restricted to moving linearly relative to each other.

According to an important aspect of the invention, the first coupling member 2 is also provided with a pair of guide flanges 18, 20, a spring or lever arm 22 on the outer surface thereof and an opening 21 in a side wall thereof for receiving a lower arm of the spring clip 8 therethrough. The space between the two guide flanges 18, 22 effectively functions as a guide slot for movement of the locking clip 8, the opening 21 is at least as long as the guide slot in the axial direction of the member 2 for permitting movement of the clip, and the guide flange 18 together with the spring arm 22 function to lock the clip 8 in a final, locking position thereof, as discussed further below.

The coupling member 2 also preferably has a drain slot or channel 24 defined in a lower surface thereof for draining water that enters within the coupling member 2 when the coupling members 2, 6 are engaged together, noting that the opening 21 in the member 2 permits entry of water between the two members. The drain slot 24 preferably extends the full length of the main hollow body of the coupling member 2 and tapers downwardly from the receiving portion 12 toward the open end 16.

The second coupling member 6 is, like the first coupling member 2, preferably constructed or molded as a unitary member from a rigid plastic such as PVC or any other appropriate material. Also, like the first coupling member, the second coupling member 6 is hollow and has openings at both ends thereof such that the cable 14 may pass completely therethrough and be moved relative thereto, such that the end of the cable 14 may be connected to an actuating or an actuatable mechanism. As best understood with reference to FIGS. 2–4, approximately ⅔–¾ of the second coupling member 6 is insertable within the first coupling member 2 when the two coupling members are locked together, while the remaining portion of the coupling member 6 is adapted to be connected to an actuating mechanism such as an electronic cruise control unit (not shown), and has a sealing flange 26 and fastening tabs 28 integrally provided therewith for connecting the coupling member 6 to the actuating mechanism. As will be understood, the structure of the sealing flange 26 and the fastening tabs 28 is not an important aspect of the invention so that the structure may be modified or eliminated if desired. As will also be understood, the second coupling member 6, rather than the first coupling member 2, could have the end of the cable sheath 4' fixed thereto, while the first coupling member 2 rather than the second coupling member 6 could have a sealing flange and fastened tabs provided thereon for being connected to an actuating or actuatable mechanism. See, for example, the structure of the second preferred embodiment shown in FIG. 8, which is discussed further hereinbelow.

According to an important aspect of the present invention, the second coupling member 6 has a row of teeth or projections 30 on an upper surface thereof for operatively engaging a corresponding row of teeth or projections 32 provided on a bottom face of the locking clip 8, as best shown in FIGS. 1–4 and discussed further hereinbelow. As shown, the end opening 16 and hollow recess of the first coupling member 2 are also shaped to receive a projection 33 and portions of the fastening tabs 28 on the second coupling member 6, which again prevents rotation of the two coupling members relative to each other when joined together.

According to another aspect of the invention, the end of the second coupling member 6 which is inserted within the first coupling member 2 is preferably, substantially closed by a nipple 36 formed integrally therewith and which projects axially from the end of the coupling member 6. The nipple 36 has a small opening defined therethrough having a diameter which is slightly larger than the outer diameter of the cable core 14 such that the cable core may pass freely, axially therethrough, while the sealing member 10 has a first opening 38 defined therein so that the member 10 may be snugly fitted over the nipple 36. The opening 38 extends completely through the sealing member 10, although the opening is reduced in size at a front end of the sealing member to a size approximately the same as the outer diameter of a cable core 14 so as to provide a water-tight seal about the core. As shown, a first portion of the sealing member 10 is substantially U-shaped and planar such that it may closely engage the end of the coupling member 6, while another portion of the member 10 is substantially cylindrically shaped such that it may sealingly fit within or abut the receiving portion 12 of the first coupling member 2. Also, to prevent rotation of the sealing member 10 about the nipple 36, the sealing member also preferably has a second opening 40 defined in the first portion thereof, and the end of the coupling member 6 has a small projecting member 42 provided thereon (see FIG. 4a) which is inserted through the opening 40 when the seal member is placed over the nipple 36. The seal member is preferably made of a flexible rubber or the like, and a small quantity of grease may be provided over the nipple 36 before the seal member 10 is placed thereover to facilitate placement of the seal member on the nipple, and to enhance the sealing ability thereof.

An operation of installing the cable 4 to an actuating or actuatable mechanism using the coupling device 1 will now be described with reference to FIGS. 2–4. The operation will specifically be described in relation to installation of the cable 4 between an electronic cruise control unit as an actuating mechanism, and an accelerator pedal, as an actuatable mechanism, again, generally indicated at 50 in FIG. 3. Of course, the cable could be used in relation to other desired actuating and actuatable mechanisms. Initially, one end of the cable (not shown in the drawings) is coupled to the accelerator pedal of a vehicle and the opposite end of the cable 4 shown in the drawings is fixed to the coupling device 1 by connecting the end of the cable sheath 4' to the receiving portion 12 of the first coupling member 2, while extending the inner cable core 14 completely through two coupling members 2,6 such that the anchoring nipple 44 fixed to the end of the cable core 14 can be connected to the cruise control unit, to which the second coupling member 6 is also connected. The length of the cable 4, and particularly the cable core 14 is sufficiently long to permit easy connection of the anchoring nipple 44 to the cruise control unit, while the opposite end of the cable is connected to an accelerator pedal or the like.

At this point, or previously, the first and second coupling members 2,6 are moved in opposite directions until the pedal correspondingly begins to move a throttle or the like (not shown) to which the pedal is also connected by another cable or the like. The first and second coupling members 2, 6 and the locking clip 8 may be locked together in a first locked position thereof by inserting the end of the second coupling member 6 partially into the first coupling member 2 through the opening 16 to an extent as shown in FIG. 3, and by inserting the locking clip 8 in a lateral direction onto the first coupling member 2 such that a lower arm of the clip 8 extends through the opening 21 in the sidewall of the first coupling member 2, and the upper arm of the clip 8 extends over the upper wall of the coupling member 2 beneath an intermediate portion of the lever arm 22. The first locked position is, again, best shown in FIG. 3. At this stage, the locking clip 8 loosely locks the first and second coupling members 2, 6 together such that they may not be separated, although they may still be moved relative to each other as further described below. Particularly, the two arms of the clip 8 are clamped about the upper wall of the coupling member 2 through inwardly projecting teeth provided on ends thereof, while the lower surface of the clip member 8 including the teeth 32 is engaged with the teeth 30 on the second coupling member 6 to prevent the second coupling member 6 from being disengaged from the first coupling member 2 through the opening 16. In this first locked position, however, the second coupling member 6 may still be moved together with the locking clip 8 further inwardly of the first coupling member 2.

When the coupling device 1 is in such first locked position, there is still a certain amount of slack or looseness in the cable core 14 even though its ends are connected to an actuatable mechanism and an actuating mechanism, respectively. Correspondingly, it is then necessary to remove the slack in the cable, or to tension the cable, and this is very simply and precisely effected according to the invention by: pulling the first coupling member 2 away from the cruise control unit until the accelerator pedal is moved by the opposite end of the core, and the pedal correspondingly begins to move a throttle or the like (not shown) to which the pedal is also connected by another cable or the like; further moving the locking clip 8 inwardly of the coupling members 2,6 through the opening 21 in a tighter fitting relationship therebetween, which also corresponds to the arrangement shown in FIG. 3; and sliding the second coupling member 6 together with the locking clip 8 further inwardly of the second coupling member 2 to the second locking position shown in FIG. 4. Such further movement of the two coupling members 2, 6 relative to each other causes the cable sheath 4', which has one end fixed to the portion 12 of the coupling member 2 and an opposite, unshown end thereof fixed to the accelerator pedal or some other body such as a vehicle frame or firewall, to flex or assume a larger radius of curvature, and such flexing of the sheath 4' correspondingly tensions the cable core 14 which extends therethrough.

According to important aspects of the present invention, the distance through which the coupling members 2, 6 are moved relative to each other between the first and second locking positions thereof is a predetermined or preset distance x as shown in FIG. 3 corresponding to a distance between an end face of the locking clip 8 and an inner face of the guide flange 18 when the coupling members 2, 6 and the locking clip 8 are in the first locking position. This is very advantageous and desirable because persons installing the cable 4 and the coupling device 1 do not have to determine or adjust just how much the cable is to be tensioned, the amount is preset.

Additionally, the lever arm 22 preferably has a locking tab 23 provided on a free end thereof which is spaced from the inner surface of the guide flange 18 by a distance corresponding to a width of the locking clip 8 such that an upper surface of the locking clip 8 becomes locked between the tab 23 and the guide flange 18 when the coupling members 2, 6 and the clip 8 are moved to the second locking position thereof as shown in FIG. 4. When the clip 8 is in the second locking position as shown in FIG. 4, the two coupling members 2, 6 are very rigidly and securely connected to each other such that they cannot be moved relative to each other because the teeth 30 of the second coupling member 6 are engaged with the teeth 32 on the bottom surface of the locking clip 8, while the upper end of the locking clip 8 is locked between the tab 23 and the guide flange 18. As will be understood, the guide flange 18 functions as a stopper for limiting inward movement of the second coupling member 6 within the first coupling member 2. Also, the locking clip 8 is inserted in a first direction relative to the coupling member 2, 6 for achieving the first locking position shown in FIG. 3, and is moved in a second direction perpendicular to the first direction when the coupling members 2, 6 are moved from the first locking position of FIG. 3 to the second locking position of FIG. 4.

As will be understood with reference to FIGS. 3 and 4, a lowest surface of the tab 23 is disposed at a level lower than an upper surface of the clip 8 when the coupling members 2, 6 and the clip 8 are in the first locking position of FIG. 3, whereby the lever arm 22 must flex upwardly to permit the clip 8 to slide beneath the tab 23 when the two coupling members are moved to the second locking position of FIG. 4, and when the coupling members reach the second locking position of FIG. 4, the lever arm 22 flexes back downwardly to engage the upper edge of the clip. Such flexing action of the lever arm desirably effects a snap fit of the coupling member 2, 6 and the clip 8 when they reach the second locking position thereof, so that persons installing the coupling device 1 will desirably and certainly know when the second locking position is achieved. To facilitate the flexing action of the lever arm 22, the locking clip may be provided with a beveled surface at an upper edge thereof, while the tab 23 may similarly be provided with a beveled lower edge, as best shown in FIGS. 2–4. Such beveled edges contact each other when the clip 8 is slid beneath the tab 23, thereby smoothly and surely flexing the tab upwardly. Also, the opposite lower edge of the tab 23 may be provided with an indent as shown at the lower left hand side thereof in FIGS. 2–4, which indent receives the upper edge of the locking clip when the clip is in the second locking position of FIG. 4, to more surely prevent the locking clip 8 from being unintentionally moved from the second locking position.

Thus, according to the present invention, the coupling members 2, 6 and the locking clip 8 may be easily and readily placed in the first locking position of FIG. 3 by partially inserting the second coupling member 6 within the first coupling member 2 and inserting the locking clip 8 into the first coupling member 2 relative to the opening 21 thereof; and then the coupling members and clip may be precisely and easily moved to the second locking position of FIG. 4 by simply sliding the second coupling member further within the first coupling member until the clip 8 is snapped-locked between the tab 23 and the guide flange 18.

Although the coupling members 2, 6 and locking clip 8 are securely and rigidly connected relative to each other in the second locking position of FIG. 4, it is possible to uncouple the members 2, 6 and the clip 8 for servicing thereof by simply flexing the lever arm 22 upwardly using a screwdriver or the like while simultaneously moving the coupling members back toward the first locking position shown in FIG. 3, after which the locking clip may be completely removed from the first coupling member 2 so that the two coupling members 2, 6 may then be completely disengaged. If desired, a small recess may be provided on a front surface of the tab 23 above the edge-engaging indent, which small recess may then be used to receive the tip of a screwdriver or the like for prying the lever arm 22 upwardly.

Although the step of locking the two coupling members 2, 6 and the clip 8 in the first locking position thereof is described above as coming subsequent to securing of the anchoring nipple 44 and the cable core end to the cruise control unit or other actuating mechanism, it is possible to secure the nipple 44 to the actuating mechanism after the coupling members 2, 6 and the locking clip 8 have been placed in the first locking position, and it may often be desirable to do so for preassembling the cable 4 and the coupling device 1 together.

Referring to FIG. 5, there is shown a second coupling device 100 according to a second preferred embodiment of the invention. The second coupling device 100 is similar to the device 1 according to the first embodiment in that it is comprised essentially of two coupling members and a locking clip, although the locking action of the second embodiment is distinct from that of the first embodiment in that the locking action involves rotation of the locking clip, as well as linear, sliding movement thereof.

More particularly, the coupling device 100 according to the second embodiment includes a first coupling member 102, a second coupling member 106 and a locking clip 108. The second locking member 106 has the sheath 4' of the sheathed cable 4 connected to one end thereof, and has a central opening through which the cable core 14 extends and is movable. The second coupling member 106 includes an insertable front portion having a substantially U-shaped cross section which is insertable within a correspondingly shaped opening and recess (not shown) of the first coupling member 102 such that the two coupling members 102, 106 are not rotatable relative to each other when coupled together. The second coupling member 106 also includes a pair of flanges 110, 132 and a threaded section 130 on the outer surface of a rear portion thereof. These components function for locking the coupling members 102, 106 and the clip 108 together, as discussed further hereinbelow. Although not shown in FIG. 8, the second coupling member 106 could have a nipple 36 and a sealing member such as the member 10 could be provided thereover similar to the first embodiment of the invention.

The first coupling member 102 is an elongate, substantially cylindrical member as shown, with an opening and recess defined therein (not shown) for slidably receiving the second coupling member 106. The opposite end of the first coupling member 102 may have a sealing flange 126 and locking tabs 128 provided thereon which are substantially similar to the flange 26 and tabs 28 of the first embodiment, for connecting the first coupling member 102 to an actuating or actuatable mechanism.

According to an important locking feature of the second embodiment, the first coupling member 102 also has a pair of guide flanges 116, 118 provided near the open end thereof and an opening 121 is defined in an upper surface of the first coupling member 102 with the flange 118 extending through a central upper portion thereof such that a first clip-receiving slot is defined within the opening 121 between the flanges 116, 118 and a second clip-receiving slot is defined between the flange 118 and a shoulder 125 of the first coupling member 102. Each of the flanges 116, 118 has a groove 122 defined therein and extending transversely thereacross, and which is shaped to receive a corresponding projection 109 on all opposite sides of the locking clip 108 when the coupling member and the locking clip are disposed in a first locking position thereof, as discussed hereinbelow. Further, a locking tab 124 is provided at a rear or right hand face of the flange 118 for locking the coupling members and the clip in a second locking position thereof, as discussed further hereinbelow.

The locking clip 108 has a semi-spherical recess 111 defined on a lower face thereof, which recess has threads formed therein which are shaped to operatively engage the threads 130 on the second coupling member 106; while surfaces of the clip adjacent the semispherical recess 111 are preferably tapered outwardly as shown to facilitate insertion of the clip onto the second coupling member 106.

A linear distance between the flanges 116, 118, or the width of the first clip-receiving slot, corresponds to a width of the locking clip 108 such that the clip 108 may be snugly, slidably fitted therebetween in a first locking position thereof, while a linear distance extending from the outer face of the flange 118 to the shoulder 125, is a predetermined distance corresponding to a predetermined tensioning amount effected by the coupling device 100.

Use of the coupling device 100 according to the second embodiment is similar to the coupling device 1 according to the first embodiment in that the coupling members 102, 106 and the clip 108 may initially be joined together in a first locking position in which the coupling members may not be disengaged, but in which the second coupling member 106 may be moved more inwardly of the first coupling member 102, and a second locking position in which the coupling members and the clip are rigidly, and immovably joined together. Particularly, for placing the two coupling members and the locking clip in the first locking position thereof, the second coupling member 106 is partially inserted into the opening and recess of the first coupling member 102 until the guide flange 132 extends inwardly of the opening 121 in the first coupling member 102, after which the locking clip 108 is slid downwardly into the first clip-receiving slot until the projections 109 on the clip 108 are engaged with the grooves 122 in the flanges 116, 118. When the clip 108 is thus inserted, the lower, tapered surfaces of the clip extend within the inner recess of the first coupling member 102 through the opening 121, and the second coupling member is prevented from being withdrawn from the first coupling member by engagement of the guide flange 132 with the lower tapered surfaces of the clip 108.

At this point, there is a certain amount of slack in the cable core 14, and to remove such slack, or tension the cable core 14, the clip 108 may be slid further downwardly between the flanges 116, 118 of the first coupling member 102 such that the threaded, semispherical recess 111 of the clip engages with the threads 130 of the second coupling member 106 adjacent the rear guide flange 110 of the second coupling member 106, and at which time lower, flat surfaces on the transverse arms of the clip 108 engage with corresponding flat surfaces 127 extending from the guide flange 116 at lower ends thereof. Further, the two coupling members 102, 106 are then moved linearly relative to each other so that the second coupling member 106 is moved further inwardly of the first coupling member 102, and such movement of the second coupling member 106 causes the locking clip 108 to move therewith beneath the guide flange 118 until it is disposed below the second clip-receiving slot. Thereafter, the clip 108 is rotated about the threaded portion 130 of the second clip member 106 so that the transverse arms of the clip are rotated within the second slot clip-receiving past the locking tab 124, thus establishing the second locked position of the coupling members and the clip.

In such second locked position of a coupling member and the clip, the clip 108 is prevented from rotating back counterclockwise toward the lower surfaces 127 of the guide flange 116 by the locking tab 124. As shown, the locking tab 124 preferably has a lower beveled surface and an upper flat surface, the lower beveled surface facilitating rotation of the clip member 108 in a clockwise direction to the second locked position thereof, and the flat upper surface preventing counterclockwise rotation of the clip out of the second locked position. Although the locking tab 124 normally locks the coupling members and the clip and the second locked position thereof, it is possible to apply sufficient force to the clip 108 to rotate it against the tab 124 without braking the tab or the clip so that the coupling device 100 may be serviced and subsequently reinstalled.

Although there have been described what are present considered to be the preferred embodiments of the invention, it will be understood by persons skilled in the art that variations and modifications may be made thereto without departing from the spirit or essence of the invention. The scope of the invention is, therefore, indicated by the appended claims, rather than by the foregoing description of the presently preferred embodiments.

We claim:

1. A coupling device for a sheathed cable, comprising:
   a first coupling member connectable to a sheath of the sheathed cable;
   a second coupling member operatively engageable to the first coupling member;
   the first and second coupling members having openings defined therethrough for receiving a core of the sheathed cable;
   a clip for securing the first and second coupling members together;
   said first and second coupling members having a plurality of locking positions, including an initial locking position and a cable length adjusting position spaced a predetermined distance from said initial locking position; and
   said first and second coupling members are adapted to increase tension of the cable core relative to the cable sheath a predetermined amount and to maintain the core tension in an increased state when the coupling members are moved from said initial locking position to said cable length adjusting position while the first coupling member is connected to the cable sheath and the cable core is operatively secured separately from the cable sheath and said coupling members.

2. A coupling device according to claim 1, wherein said clip is selectively engageable between said first and second coupling members, said first and second coupling members are movable relative to each other said predetermined distance from said initial locking position to said cable length adjusting position while engaged by said clip, and said device further includes means to prevent said coupling members and said clip from being moved relative to each other after the coupling members are moved into said cable length adjusting position.

3. A coupling device according to claim 1, wherein said first coupling member is open at one end thereof and has a recess defined therein extending inwardly from said open end, and said second coupling member is shaped to be slidingly fitted in said recess of said first coupling member such that one end of the second coupling member is enclosed in said recess when the coupling members are engaged together.

4. A coupling device according to claim 1, further including means to prevent said coupling members from being moved relative to each other after the coupling members are moved into said cable length adjusting position.

5. A coupling device according to claim 1, wherein said first and second coupling members are adapted to receive contiguous portions of the cable core, respectively, therein when the coupling members are operatively engaged together.

6. A coupling device according to claim 1, further including the sheathed cable in combination therewith, and the cable sheath is connected to the first coupling member.

7. A coupling device for a sheathed cable, comprising:

a first coupling member for being attached to an end of a sheath of said sheathed cable, said first coupling member being open at one end thereof and having a recess defined therein extending inwardly from said open end;

a second coupling member shaped to be slidingly fitted in said recess of the first coupling member such that one end of the second coupling member is enclosed within said recess;

said first and second coupling members having openings defined therethrough so that an end of a core of the sheathed cable may be axially extended through the coupling members for being operatively connected to one of an actuating mechanism and an actuatable mechanism; and a clip for securing said first and second coupling members together;

said first coupling member having an opening defined in a side wall thereof;

said clip being insertable into said opening in said side wall to engage surfaces of said first and second coupling members; and said first and second coupling members being positionable in different positions relative to each other when engaged by said clip, including an initial locking position and a cable length adjusting locking position spaced a predetermined distance from said initial locking position.

8. A coupling device according to claim 7, wherein said first coupling member includes a lever arm and a stop member projecting from an outer surface thereof near said opening in said side wall, said lever arm, said side wall of said first coupling member, and said stop member define a guide slot between, and said clip being moveable within said opening in said side wall and along said guide slot as said coupling members are moved from said initial locking position to said cable length adjusting locking position.

9. A coupling device according to claim 8, wherein said lever arm has a tab on a free end thereof extending towards the outer surface of said first coupling member, said tab and said stop member securely engage said clip therebetween when said first and second coupling members are in said cable length adjusting locking position.

10. A coupling device according to claim 5, wherein said first and second coupling members are adapted to increase tension of the cable core relative to the cable sheath a predetermined amount and to maintain the core tension in an increased state when the coupling members are moved from said initial locking position to said cable length adjusting position while the first coupling member is connected to the cable sheath and the cable core is operatively secured separately from the cable sheath and said coupling members.

11. A coupling device according to claim 7, further including means to prevent said coupling members and said clip from being moved relative to each other after the coupling members are moved into said cable length adjusting position.

12. A coupling device according to claim 7, wherein said clip includes a pair of arms and is substantially U-shaped, one of said arms having a row of teeth on an outer surface thereof, and said second coupling member having a row of teeth on a portion of an outer surface thereof;

said pair of arms of said clip are secured about said side wall of the first coupling member when the clip is inserted in said opening in said side wall; and said row of teeth on said one arm of said clip securely engage said row of teeth on the portion of the outer surface of said second coupling member when said clip is inserted in said opening in said side wall.

13. A coupling device according to claim 7, further including a seal disposed between said first and second coupling members within said recess of said first coupling member, said seal being adapted to prevent moisture from being introduced into the end of the cable sheath along the cable core when the first coupling member is connected to the cable sheath and the cable core extends through the first and second coupling members.

14. A coupling device according to claim 7, further including a drain to drain moisture from between the first and second coupling members when the coupling members are secured together by said clip.

15. A coupling device according to claim 7, wherein said first and second coupling members are adapted to receive contiguous portions of the cable core, respectively, therein when the coupling members are operatively engaged together.

16. A coupling device for a sheathed cable, comprising:

a first coupling member for being attached to an end of a sheath of said sheathed cable and having a recess defined therein;

a second coupling member shaped for insertion into said recess of said first coupling member;

said first and second coupling members having openings defined therethrough so that the coupling members are adapted to receive a core of the sheathed cable therethrough such that an end of the cable core may be operatively connected to one of an actuating mechanism and an actuatable mechanism;

locking means for locking the first and second coupling members together when said second coupling member is inserted into the recess of the first coupling member;

said locking means locks said first and second coupling members together in multiple positions relative to each other, including a first position and a second position; and said locking means includes a clip member engageable between said first and second coupling members, said clip member being movable in a first direction to lock the coupling members together in said first position, and said clip member being movable in a second, different direction to lock said coupling members together in said second position.

17. A coupling device according to claim 16 wherein said coupling members are moveable relative to each other in said first locking position and are moveable a predetermined distance relative to each other when moved from said first position to said second position for increasing tension of the cable core relative to the cable sheath a predetermined amount, and said device further includes means to prevent said coupling members and said clip member from being moved relative to each other after the coupling members are moved into said second position.

18. A coupling device according to claim 16, wherein said first and second coupling members are adapted to increase tension of the cable core relative to the cable sheath a predetermined amount and to maintain the core tension in an increased state when the coupling members are moved from said first position to said second position while the first coupling member is connected to the cable sheath and the cable core is operatively secured separately from the cable sheath and said coupling members.

19. A coupling device according to claim 16, wherein said clip member includes a pair of arms and is substantially U-shaped, said first coupling member has an opening defined in a sidewall thereof, one of said arms of the clip member has a row of teeth provided on an outer surface thereof, and said second coupling member has a row of teeth provided on a portion of an outer surface thereof;

said clip member being insertable into said opening in said side wall for locking said first and second coupling members together;

said pair of arms of said clip member are secured about said sidewall of said first coupling member when the clip member is inserted in said opening in said side wall; and said row of teeth on said one arm of said clip member securely engage said row of teeth on the portion of the outer surface of said second coupling member when the clip member is inserted in said opening in said side wall.

20. A coupling device according to claim 16, wherein said first coupling member has an opening defined in a side wall thereof for receiving said clip member, said first coupling member includes a lever arm and a stop member projecting from an outer surface thereof near said opening in said side wall, said lever arm, said sidewall of said first coupling member, and said stop member define a guide slot between, and said clip member being moveable within said opening in said side wall and along said guide slot as said first and second coupling members are moved from said first locking position to said second position.

21. A coupling device according to claim 16, wherein said first and second coupling members are adapted to receive contiguous portions of the cable core, respectively, therein when the coupling members are operatively engaged together.

22. A method for tensioning a sheath covered flexible wire cable, comprising the steps of:

attaching an end of a sheath of said sheath covered cable to a first coupling member, said first coupling member having a recess defined therein;

inserting a second coupling member into said recess of said first coupling member;

extending an end of a core of the sheath covered cable axially through openings defined in said first and second coupling members and connecting the end of a core to one of an actuating mechanism and an actuatable mechanism;

locking said first and second coupling members together in a first locking position thereof by engaging a clip member between the first and second coupling members;

moving said coupling members, as engaged by said clip member, a predetermined distance from said first locking position to a second locking position for thereby increasing tension of the cable core relative to the cable sheath a predetermined amount; and locking said coupling members in said second locking position together with said clip member such that the coupling members and said clip member cannot be moved relative to each other and the core tension is maintained in an increased state.

23. A method according to claim 22, wherein one end of said second coupling member is enclosed in said recess of said first coupling member after said second coupling member is inserted into said recess.

24. A method according to claim 23, wherein contiguous portions of the cable core, respectively, are received in said first and second coupling members when the coupling members are locked together.

* * * * *

UNITED STATES PATENT AND TRADEMARK OFFICE
CERTIFICATE OF CORRECTION

PATENT NO. : 5,921,143
DATED : 13 July 1999
INVENTOR(S) : Gilbert Castillo, Masahiro Izumi It is certified that error appears in the above-identified patent and that said Letters Patent is hereby corrected as shown below:

Column 1, line 49, change "presenting" to --preventing--.

Column 13, line 57 (claim 10, line 1), change "5" to --7--.

Column 14, line 13 (claim 12, line 10), change "engage" to --engages--.

Column 15, line 27 (claim 19, line 16), change "engage" to --engages--.

Signed and Sealed this

First Day of February, 2000

Attest:

Q. TODD DICKINSON

*Attesting Officer*       *Acting Commissioner of Patents and Trademarks*